Patented Mar. 21, 1944

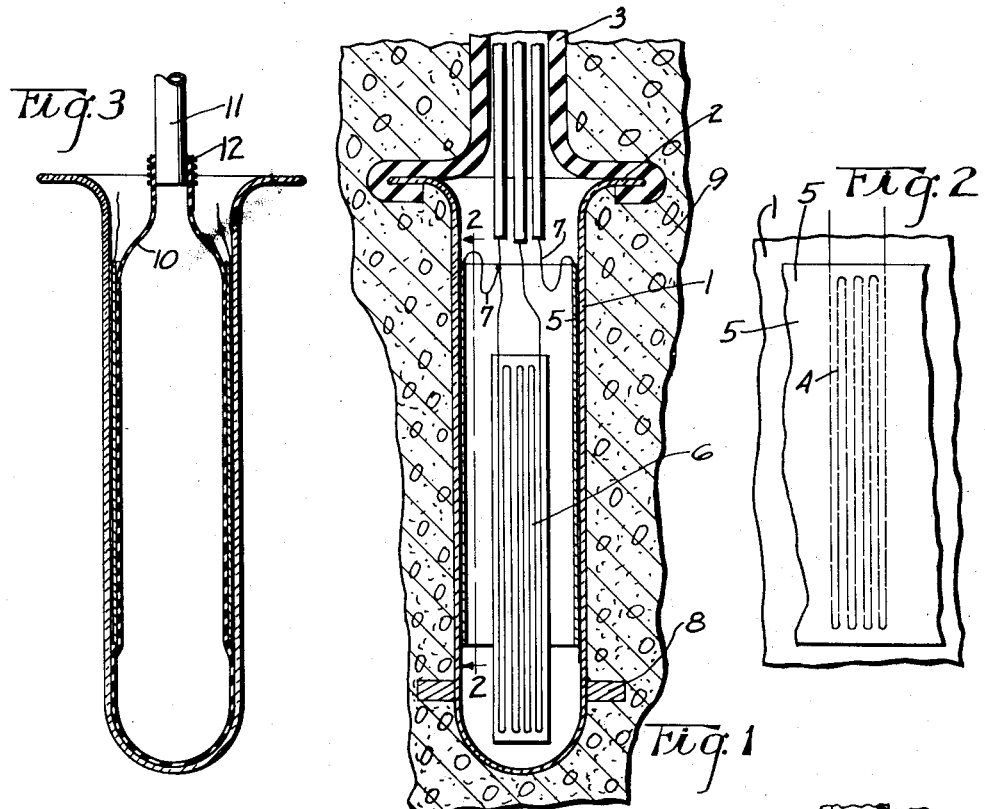
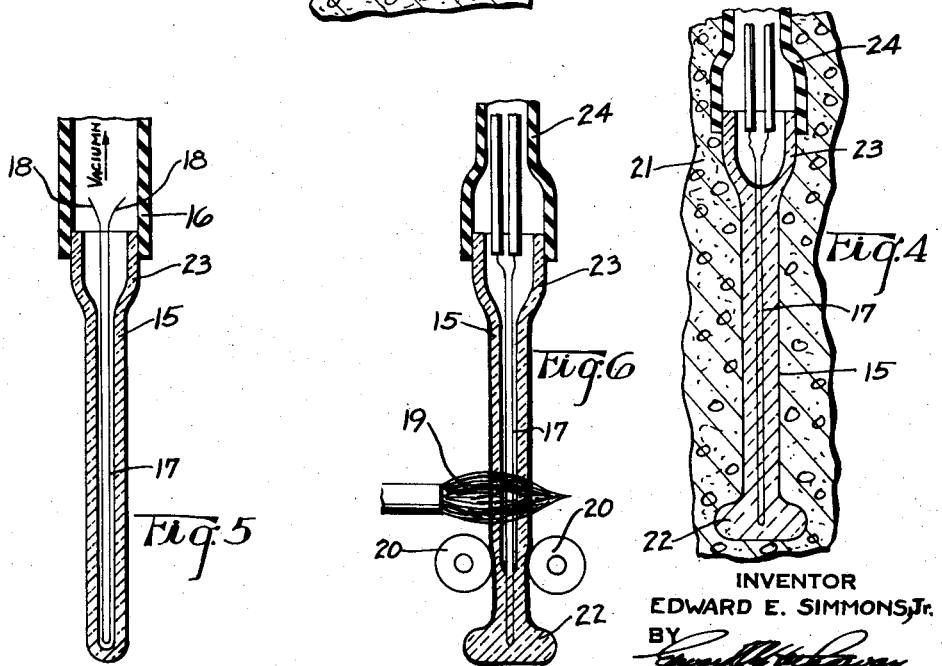

2,344,648

UNITED STATES PATENT OFFICE 2,344,648

MOISTUREPROOF STRAIN GAUGE

Edward E. Simmons, Jr., Pasadena, Calif.

Application June 20, 1942, Serial No. 447,825

13 Claims. (Cl. 201—63)

This invention relates generally to strain gauges and more particularly to a permanently moisture-proof gauge and method of making the same.

The strain gauge disclosed herein employs the fundamental principle of the type of gauge disclosed in my copending application Serial No. 320,327, filed February 23, 1940, now Patent No. 2,292,549, issued August 11, 1942, wherein a filament whose electrical resistance varies with change of strain is bonded throughout its effective length to a member subject to strain variations. The filament is connected to a suitable electrical circuit for measuring the change in filament resistance in response to variations in strain but because of the gauge carrying an electrical current it is exceedingly difficult to use the same in the presence of water, especially if there is any likelihood of the gauge being permanently submerged in water or embedded in a structure subject to moisture. Certain materials and construction that might be used for housing the gauge filament are sufficient to keep the gauge dry temporarily but such arrangements are not completely impervious to water or to water vapor and accordingly it is merely a matter of time before such gauge arrangements are rendered useless because of short circuiting or other moisture interference. While my present invention is directed particularly to the field of moisture-proof strain gauges, yet certain of its features for bonding the filament may be used in other types of gauges thereby obtaining the benefits of moisture resistance as well as an effective bond.

It is an object of my invention to provide an improved strain gauge of the bonded filament type and an improved method for making the same and to provide especially an improved moisture-proof gauge.

Another object is to provide an improved moisture-proof strain gauge that is relatively simple in construction, operation and maintenance, is compact and durable combined with a high degree of sensitivity, accuracy and responsiveness while also being highly impervious to liquids or other liquid vapors whereby maximum reliability can be obtained.

A further object is to provide an improved moisture-proof gauge that can be conveniently anchored in or secured to a structure so as to similarly strain both the filament and its moisture-proof container.

Other objects and advantages will be more apparent to those skilled in the art from the following description of the accompanying drawing in which:

Fig. 1 is a sectional view of one form of my improved gauge shown embedded in a concrete structure;

Fig. 2 is a fragmentary vertical section taken substantially on the lines 2—2 of Fig. 1;

Fig. 3 is a sectional view showing one step in the method of manufacturing the Fig. 1 type of gauge;

Fig. 4 is a sectional view of a modified form of gauge; and

Figs. 5 and 6 are certain steps employed in the manufacture of the Fig. 4 type of gauge.

In the embodiment of the invention shown in Fig. 1 a metallic or otherwise moisture-proof tube 1 is closed at its lower end and is provided with a circular flange 2 at its upper end, a lead covered cable 3 being reversely bent around the bottom of the flange and hermetically sealed thereto by soldering or by any other desired method. A strain gauge filament 4 is the same as that disclosed in my said copending application and therefore need not be further described herein. This filament is suitably bonded throughout its length to the inner surface of tube 1, the bonding preferably being through the medium of a thermal plastic adhesive coated paper 5. The gauge filament 4 is placed against the inner surface of tube 1 and the thermal plastic paper is placed over the filament. Any number of gauge units, one of which is shown in Fig. 2, may be placed around the inside of tube 1 and a dummy gauge 6 may be inserted freely in the tube for temperature compensation purposes. The strain gauge that is bonded to the inner wall of tube 1 and the dummy gauge 6 are suitably electrically connected together by leads 7 extending out through the lead covered cable 3 to a connection such as a Wheatstone bridge or oscillograph. A flange 8 is suitably integrally formed with or otherwise rigidly connected to the lower end of tube 1 so that when the gauge is embedded in a structure 9 of concrete or other material the flanges 2 and 8 firmly anchor the tube so as to subject the same to strains in a direction axially thereof. These axial strains in the tube are transmitted to the strain gauge filaments 4 so as to vary their resistance. If two strain gauges are employed they may be disposed at diametrically opposite points on the inner surface of the tube 1 thereby averaging unequal strains on opposite sides of the tube. This gauge construction provides a hermetically sealed unit that is impervious to liquid or liquid vapor and can be made an effective permanent part of a test structure or submerged in water for extensive periods of time without danger of having the gauge filament affected by moisture. The gauge filament is suitably arranged in any desired form preferably with a plurality of series connected parallel strands running longitudinally of the tube.

My improved method for forming the gauges consists in bonding the gauges 4 to the inner wall of tube 1 by placing the thermal plastic coated paper 5 around the entire inner circumference of tube 1, the gauge being first positioned and embedded in the thermal plastic coat of the paper on its side toward the tube 1. A fluid operated rubber balloon 10 or other expansible and contractible mandril is inserted within the tube and either air or hydraulic pressure is supplied through a pipe 11 to expand balloon 10 radially outwardly and thus firmly hold the thermal plastic paper 5 against the inner wall of the tube and thus firmly press the gauge filament against the tube wall. When heat is applied the thermal plastic coat on the paper will soften sufficiently so as to completely bond the gauge filaments to the inner surface of tube 1 thereby causing the filament to be bonded throughout its effective length to the tubular member 1 so as to be responsive to strains induced therein. The balloon 10 may be disconnected at its joint 12 from supply pipe 11 and either removed from the tube or left therein, if desired. Usually the filament would cover the entire interior cylindrical surface of the tube so as to be insensitive to bending strains.

In the modification shown in Figs. 4 to 6, I provide a hollow glass tube 15 closed at its lower end and somewhat enlarged at its upper end for connection to a tube 16 through which a vacuum is drawn by suitable means. A gauge filament 17 extends into the hollow interior of the glass tube, this filament being of any suitable form desired although specifically it is a single strand reversely bent at its lower end and with its upper ends extending freely into the vacuum tube 16. The glass tube is then heated with a suitable burner 19, the vacuum preventing air bubbles in the tube during sealing and providing an inward pressure on the soft glass near the flame due to atmospheric pressure, thus collapsing the tube upon the filament. Through this process the tube can be sealed without any other compressing means if desired. If desired, the hollow interior may be closed upon and bonded to the filament in any suitable manner diagrammatically shown as a pair of rollers 20. The heated glass when in its plastic stage will allow the filament to be embedded in the glass thereby firmly bonding the filament throughout its effective length, it being understood that the entire length of the glass tube is passed through flame 19 and rollers 20, if they are used, until the desired effective length of the filament is entirely bonded as shown in Fig. 4. The actual bond is probably effected by fusion of the glass with the usual oxide layer on the metallic filament. The broad idea of sealing a strain filament by the oxide bond technique is also applicable to a glass structure of a general form such as a glass block or cylinder or in the sides of a hollow tube made of glass or the sealing of a filament in a multi-holed tube or the use of one or two very small tubes of glass covering the filament 17 of Fig. 5 to insure no contact in the fabrication of the gauge of Fig. 5. Broadly the glass constitutes a fusible glass cement coating for attaching a filament to the surface of any desired test structure such, for example, as dynamometer bars and pressure elements. Thus, in any case the glass constitutes a support for transmitting strain to the filament throughout its length.

For high temperature applications, a thin coating of quartz may be evaporated on the surface of a test member to serve as an insulating medium between the wire filament and test member. A high temperature cement or fusible glass is used to attach the filament throughout its effective length to the test member.

As for a connection of the filament to an external cable, the glass-to-metal sealing techniques now common in vacuum tube and fluorescent lamp manufacture provides a tight strong connecting arrangement between a glass structure and a metallic covered cable. The glass seals directly to a metal sleeve and the cable sheath can easily be soldered to the metal sleeve insuring a permanent joint.

Also, to insure adequate anchorage in a test structure 21 a lower flanged end 22 may be formed on the glass tube while an enlarged end 23 serves as an anchorage flange at the upper end of the tube. The gauge filament is suitably connected to a lead covered cable 24 which may be cemented, fused or otherwise hermetically sealed to the enlarged end of the tube. The tube 15 is embedded in the structure 21 and the cable 24 is extended to any suitable external instruments.

From the foregoing disclosure of various modifications disclosed herein it is seen that I have provided a very simple and effective hermetically sealed gauge impervious to moisture and adapted to be made in a simple and compact manner combined with ruggedness and ease of application to a structure in which the gauge is to be embedded or associated.

It will of course be understood that various changes in details of construction and arrangements of parts may be made by those skilled in the art without departing from the spirit of the invention as set forth in the appended claims.

I claim:

1. A moisture-proof strain gauge comprising in combination, a tubular member sealed against moisture entering the same, a filament whose electrical resistance varies in accordance with strain thereof disposed within said tube and bonded thereto throughout the effective length of the filament, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

2. A moisture-proof strain gauge comprising, in combination, a tubular member closed at one end and having a water-proof cable with wires encased in a covering that is connected and sealed to the other end of the tube, a filament whose electrical resistance varies in accordance with the strain thereof disposed in said tube and bonded thereto throughout the effective length of the filament, the filament being connected to the cable wires, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

3. A moisture-proof strain gauge comprising, in combination, a tubular member, a filament whose electrical resistance varies in accordance with strain thereof disposed within said tube, thermal plastic means for bonding said filament to the inner wall of said tubular member throughout the effective length of the filament, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

4. A strain gauge comprising, in combination, a tubular member, a filament whose electrical resistance varies in accordance with strains thereof disposed within said tube, means for bonding said filament to the inner wall of said tubular member throughout the effective length of the filament, a dummy gauge similar to said strain responsive filament disposed within said tubular member and connected to said bonded filament to compensate for temperature variations, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

5. A moisture-proof strain gauge comprising, in combination, a tubular member having enlarged axially spaced portions adapted to be anchored in a structure subject to strain, a filament whose electrical resistance varies in accordance with strain thereof disposed within said tube and bonded thereto throughout the effective length of the filament, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

6. A moisture-proof strain gauge comprising, in combination, a filament whose electrical resistance varies in accordance with strain thereof, a permanently hollow tubular member within which said filament is sealed against external moisture and is bonded to the interior of said tube throughout the effective length of the filament, and said tubular member having provision for being positively engaged by a body subject to strain whereby strains in the body cause a corresponding strain in the tubular member which transmits the strain through the bond to said filament throughout its effective length to cause a predetermined change in the electrical resistance of the filament.

7. A moisture-proof strain responsive apparatus comprising, in combination, a tubular member of thermal plastic material such as glass, a filament whose electrical resistance varies in accordance with strain thereof disposed within said tube and bonded thereto by fusion of the glass to the filament to hold the same in an axial position and to vary the strain of the filament in accordance with variations of strain in the tubular member, and said tubular member having provision whereby an external force may be applied to said tubular member to subject the same to strain and effect said corresponding strain of said filament so as to change its electrical resistance.

8. A strain gauge comprising, in combination, a filament of material whose electrical resistance varies in accordance with strain thereof, a glass element bonded to said filament throughout its effective length whereby said glass element constitutes a support for transmitting strain to said filament, and said glass element having provision for being positively engaged by a body subject to strain whereby strains in the body cause a corresponding strain in the glass element which transmits the strain through the bond to said filament throughout its effective length to cause a predetermined change in the electrical resistance of the filament.

9. A strain gauge comprising, in combination, a filament of material whose electrical resistance varies in accordance with strain thereof, means for transmitting strain to said filament from a test member including a glass coating in which said filament is embedded and bonded throughout its length, and said test member having provision for being positively engaged by a body subject to strain whereby strains in the body cause a corresponding strain in the test member which transmits the strain through the bond to said filament throughout its effective length to cause a predetermined change in the electrical resistance of the filament.

10. A moisture-proof strain responsive apparatus comprising, in combination, a tubular member, a filament whose electrical resistance varies in accordance with strain thereof disposed within said tube and bonded thereto so as to support the filament in an axial direction whereby variations of strain in the tubular member cause variations of strain of the filament, and said tubular member having provision whereby an external force may be applied to said tubular member to subject the same to strain to effect said corresponding strain of said filament so as to change its electrical resistance.

11. In combination, a filament of material whose electrical resistance varies in accordance with strain thereof, a fusible material adapted to be subjected to strain upon application of force thereto and said filament being embedded in and bonded throughout its effective length to said material by the fusible action thereof, and said fusible material having provision for being positively engaged by a body subject to strain whereby strains in the body cause a corresponding strain in the fusible material which transmits the strain through the bond to said filament throughout its effective length to cause a predetermined change in the electrical resistance of the filament.

12. A strain gauge comprising, in combination, a filament of material whose electrical resistance varies in accordance with strain thereof, said filament having an oxide layer covering its surface, a glass support for said filament having an oxide bond with the filament throughout its effective length, and said glass support having provision for being positively engaged by a body subject to strain whereby strains in the body cause a corresponding strain in the glass support which transmits the strain through the bond to said filament throughout its effective length to cause a predetermined change in the electrical resistance of the filament.

13. The method of making a strain gauge consisting of taking a metallic filament of strain gauge material whose electrical resistance varies in accordance with strain thereof and which is normally covered with an oxide layer and then bonding a glass base to the filament throughout its effective length by the application of heat and pressure to the glass which effects a fusible bond with the oxide layer.

EDWARD E. SIMMONS, Jr.